(12) United States Patent
Olkkonen et al.

(10) Patent No.: US 11,650,424 B2
(45) Date of Patent: May 16, 2023

(54) WAVEGUIDE DISPLAY HAVING IMPROVED BRIGHTNESS

(71) Applicant: DISPELIX OY, Espoo (FI)

(72) Inventors: Juuso Olkkonen, Espoo (FI); Antti Sunnari, Espoo (FI)

(73) Assignee: DISPELIX OY, Espoo (FI)

( * ) Notice: Subject to any disclaimer, the term of this patent is extended or adjusted under 35 U.S.C. 154(b) by 186 days.

(21) Appl. No.: 16/954,865

(22) PCT Filed: Dec. 18, 2018

(86) PCT No.: PCT/FI2018/050938
§ 371 (c)(1),
(2) Date: Jun. 17, 2020

(87) PCT Pub. No.: WO2019/122521
PCT Pub. Date: Jun. 27, 2019

(65) Prior Publication Data
US 2021/0088791 A1      Mar. 25, 2021

(30) Foreign Application Priority Data

Dec. 22, 2017 (FI) ..................................... 20176164

(51) Int. Cl.
*G02B 27/01* (2006.01)
*G02B 5/08* (2006.01)
(Continued)

(52) U.S. Cl.
CPC ....... *G02B 27/0172* (2013.01); *G02B 5/0825* (2013.01); *G02B 5/1814* (2013.01); *G02B 6/0055* (2013.01); *G02B 27/0081* (2013.01)

(58) Field of Classification Search
CPC .............. G02B 27/017; G02B 27/0172; G02B 5/0825; G02B 5/1814; G02B 6/0055;
(Continued)

(56) References Cited

U.S. PATENT DOCUMENTS 8,830,588 B1    9/2014  Brown et al.
9,118,356 B2 *  8/2015  Michalske ........... H04B 5/0037
(Continued)

FOREIGN PATENT DOCUMENTS

CN    104360484 A    2/2015
EP    3 500 889 A1   6/2019
(Continued)

OTHER PUBLICATIONS

FI Search Report in U.S. Appl. No. 20/176,164 dated Jun. 11, 2018.
(Continued)

*Primary Examiner* — Vijay Shankar
*Assistant Examiner* — Cory A Almeida
(74) *Attorney, Agent, or Firm* — Maschoff Brennan

(57) ABSTRACT

The invention relates to a diffractive waveguide display element comprising a waveguide body (13) having a first surface and a second surface opposite to the first surface, an outcoupling-diffractive optical element on said first surface for coupling light propagating inside the waveguide body out of the waveguide body, and a narrow-band reflector element (21) on said second surface. The invention also relates to a display device comprising such element.

19 Claims, 2 Drawing Sheets

(51) Int. Cl.
   *G02B 5/18*    (2006.01)
   *F21V 8/00*    (2006.01)
   *G02B 27/00*   (2006.01)

(58) Field of Classification Search
   CPC ............ G02B 27/0081; G02B 27/0101; G02B 27/0103; G02B 27/0141; G02B 27/0142; G02B 5/201; G02B 5/203; G02B 5/26; G02B 2027/0118
   See application file for complete search history.

(56) References Cited

U.S. PATENT DOCUMENTS

| | | | |
|---|---|---|---|
| 2008/0285137 | A1 | 11/2008 | Simmonds et al. |
| 2010/0066941 | A1* | 3/2010 | Duong .................. G02B 6/005 362/616 |
| 2015/0002528 | A1 | 1/2015 | Bohn et al. |
| 2017/0017081 | A1 | 1/2017 | Yu |
| 2017/0212348 | A1 | 7/2017 | Fu et al. |
| 2017/0276948 | A1 | 9/2017 | Welch et al. |
| 2017/0293141 | A1 | 10/2017 | Schowengerdt et al. |
| 2017/0371090 | A1* | 12/2017 | Fattal .................. G02B 6/0035 |
| 2018/0052320 | A1* | 2/2018 | Curtis .................. G02B 5/1857 |
| 2019/0317270 | A1* | 10/2019 | Tammela ............. G02B 6/0026 |
| 2020/0018886 | A1* | 1/2020 | Fattal .................. G02B 6/0068 |

FOREIGN PATENT DOCUMENTS

| | | |
|---|---|---|
| WO | 2016/148689 A1 | 9/2016 |
| WO | 2016162606 A1 | 10/2016 |
| WO | 2018039277 A1 | 3/2018 |

OTHER PUBLICATIONS

EP Search Report in Application No. 18892562.2 dated Jul. 28, 2021.

CN Office Action in Application No. 201880082063.2 dated Jul. 30, 2021.

Glybovski, S. et al. Metasurfaces: From microwaves to visible In: Physics Reports. Elsevier [online], May 4, 2015, vol. 634, pp. 1-72.

* cited by examiner

WAVEGUIDE DISPLAY HAVING IMPROVED BRIGHTNESS

FIELD OF THE INVENTION

The invention relates to diffractive waveguide displays. In particular, the invention relates to an improved out-coupling arrangement in such displays.

BACKGROUND OF THE INVENTION

Head-mounted displays (HMDs) and head-up displays (HUDs) can be implemented using waveguide technology. Light can be coupled to a waveguide, redirected therein or coupled out of the waveguide using diffraction gratings. In one conventional display design, light is directed from a projector to an in-coupling grating, which diffracts the wavelengths of the incoming light into the waveguide, where they propagate via total internal reflections towards an out-coupling grating. The out-coupling grating diffracts light out of the waveguide, reproducing the image originally displayed to the in-coupling grating.

Out-coupling gratings of diffractive lightguides typically out-couple light towards the user's eye but also to opposite direction towards the world side. This especially happens when binary gratings are used as out-couplers. The light out-coupled towards the world side can be reflected back towards the eye by a mirror, such as an Al or Ag-based mirror. In the best case, the mirror can double the brightness of the virtual image and also increases user's privacy. A drawback in known solutions is that the mirrors reduce the see-through transmittance of the lightguide too much for certain solutions.

SUMMARY OF THE INVENTION

It is an aim of the invention to overcome at least some drawbacks of the prior art and to provide a novel display element that has improved brightness and suits for see-through applications.

The invention is based on using as the mirror a narrow-band reflector, such as a dielectric multilayer reflector. As the ambient light surrounding the user has typically continuous spectrum, the narrow-band reflector can be designed so that sufficient see-through transmittance, in particular a transmittance of at least 50%.

In particular, if the light in-coupled to the waveguide contains only one or more narrow spectral peaks, and the reflectance band or bands of the narrow-band reflector are set to correspond to the in-coupled wavelength peaks, both improved brightness and ambient light transmittance is achieved.

In particular, the invention is characterized by what is stated in the independent claims.

Thus, according to one aspect, the invention provides a diffractive waveguide display element comprising
a waveguide body having a first surface and a second surface opposite to the first surface,
an out-coupling diffractive optical element on said first surface for coupling light propagating inside the waveguide body out of the waveguide body, and
a narrow-band reflector element on said second surface aligned with the out-coupling diffractive optical element.

The invention is thus especially useful with projectors using light sources with narrow spectral bandwidth, in particular FWHM<20 nm, such as FWHM<10 nm. The most obvious choice is a laser source but also spectrally filtered LEDs and phosphor LEDs with narrow emission spectrum are suitable.

According to a second aspect, the invention provides a see-through display, comprising a waveguide display element of the above kind, and a narrow-band projector comprising at least one narrow-band light source having an output wavelength, wherein the laser projector is configured to couple an image to be displayed in to the waveguide body for propagation therein and for further exiting the waveguide body to an eye of a user of the display partially directly from the out-coupling grating and partially through reflection from the reflector element.

The invention offers significant benefits. First of all, it solves the problem of improved brightness or the virtual image, while maintaining the ability to pass ambient light to the user's eye with high efficiency.

The privacy of the user is also improved, as the image-forming wavelength or wavelengths are directed only to the user's side of the display. This has particular relevance with HMDs.

Also coupling of projector light to the surroundings is reduced, which is of particular importance with HUDs, such as vehicle HUDs and airplane HUDs.

The dependent claims are directed to selected embodiments of the invention.

In some embodiments, the reflector element is a single-band reflector element, whereas in alternative embodiments, it is multi-band reflector element, such as an RGB reflector element with separate red, green and blue reflectance peaks.

In some embodiments, the width of the wavelength band(s) of the reflectance peak(s) is/are 50 nm or less, such as 20 nm or less (FWHM), matched with the output wavelength(s) of the projector.

In some embodiments, the reflector element has a total white light transmittance of at least 50%, such as at least 75%. The narrow blocking bandwidth(s) of the reflector element make this possible.

In some embodiments, the reflector element comprises a dielectric multilayer structure, in particular one comprising a stack of alternating layers having different indices of refraction. High wavelength selectivity is achieved with such structure.

In some embodiments, the reflector element comprises semi-transparent metallic layer, in particular a single-metal layer, such as a layer having a thickness of 20 nm or less. By choosing the material and layer thickness suitably, a wavelength-selective element can be produced.

In some embodiments, the reflector is optically insulated from the main lightguide, for example, by a thin airgap. The gap length can be chosen so that the optical path length different between directly out-coupled light rays and light rays reflected once from the reflector at zero or low angle, is larger than their coherence length. This prevents or at least decreases interference of directly out-coupled and reflected light fields, and the resulting image artifacts.

In some embodiments, the reflector element has laterally non-uniform optical properties. For example, there may be a continuous property gradient or the reflector element may comprise a plurality of distinct segments positioned laterally adjacent to each other, the segments having different reflectances and/or wavelength characteristics.

In some embodiments the segments contain a first segment located distally to a second segment with respect to the area of the out-coupling diffractive optical element, and the reflectance of the first segment is higher than the reflectance of the second segment.

Next, embodiments of the invention and advantages thereof are discussed in more detail with reference to the attached drawings.

DETAILED DESCRIPTION OF EMBODIMENTS

Figure 1:
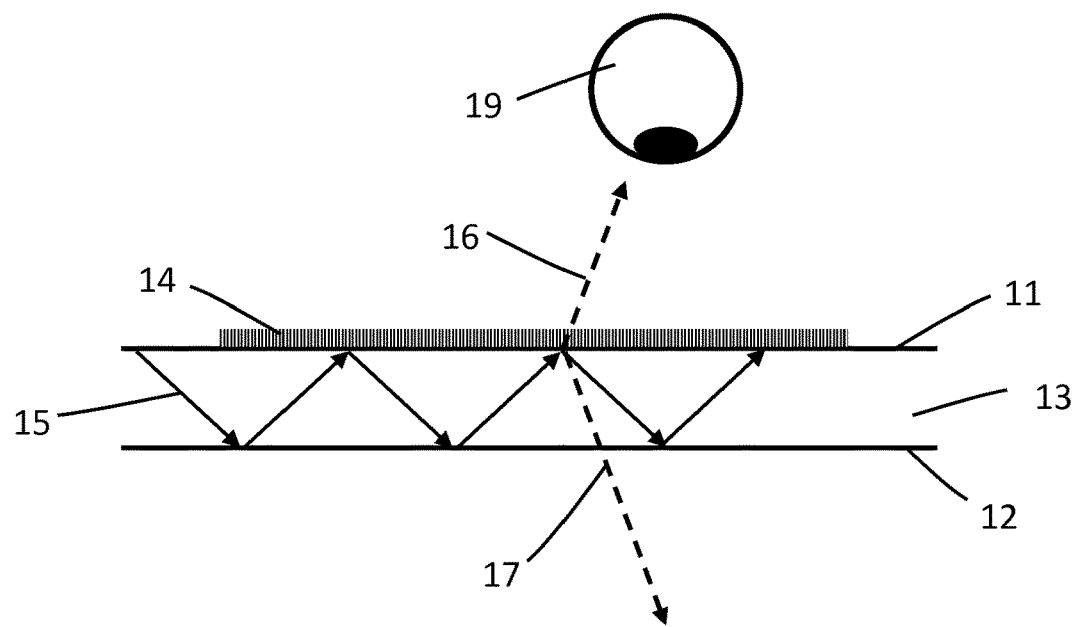
FIG. 1 shows a cross-sectional side view of a section of a waveguide comprising an out-coupling grating and without a reflector.

FIG. 1 shows a lightguide 13 defined by air/lightguide material interfaces 11 and 12. When the light field 15 propagating via total internal reflections inside the lightguide encounters the out-coupling grating 14, the grating typically generates reflected and transmitted light fields 17, 16, respectively. The transmitted light field 16 is received by the eye 19 while the reflected field 17 is wasted.

Figure 2:
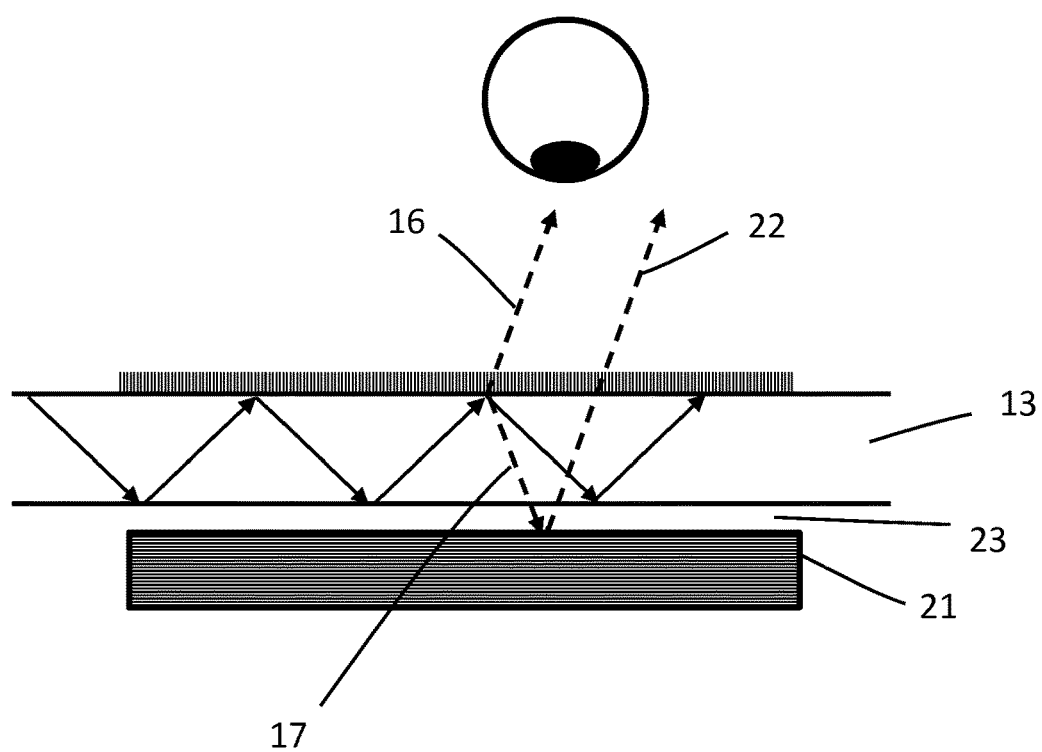
FIG. 2 shows a cross-sectional side view of a section of a waveguide according to one embodiment of the invention.

FIG. 2 shows a configuration in which the reflected light field 17 is reflected back towards the eye by a dielectric multilayer reflector 21. The reflected field 22 is received by the eye.

The reflector is optically isolated from the lightguide by the air gap 23. If the fields 16 and 22 interfere (i.e. their optical path length difference is smaller than their coherence length), the air gap 23 can be increased to increase the optical path length difference and thus avoid the optical interference.

The coating can be a single or a multilayer structure on the carrier substrate. The single layer coating can be, for example, thin semi-transparent metallic layer. For example, 1-20 nm thick Au, Ag or Al layer. Multilayer structure can consist of a stack of multiple pairs of high and low refractive index material layers. In some configuration, the stack consists of multiple identical pairs. In some configurations, all the layers can have different thicknesses and/or refractive indexes. The stack can be numerically optimized by using multilayer solvers based directly on Maxwell equations. The basic idea is to find a multilayer structure that reflects as much as possible out-coupled light towards the user's eye but still maintaining high see-through transparency at the wavelengths not emitted by the projector. The high refractive index materials can be, for example, metal oxides such as $Al_2O_3$ and $TiO_2$. The low refractive index medium can be, e.g. $MgF_2$, $SiO_2$, or some aerogel material. Aerogel materials are attractive as their refractive index is close to 1. Also low refractive index materials based on fluorinated monomers can be used.

Figure 3:
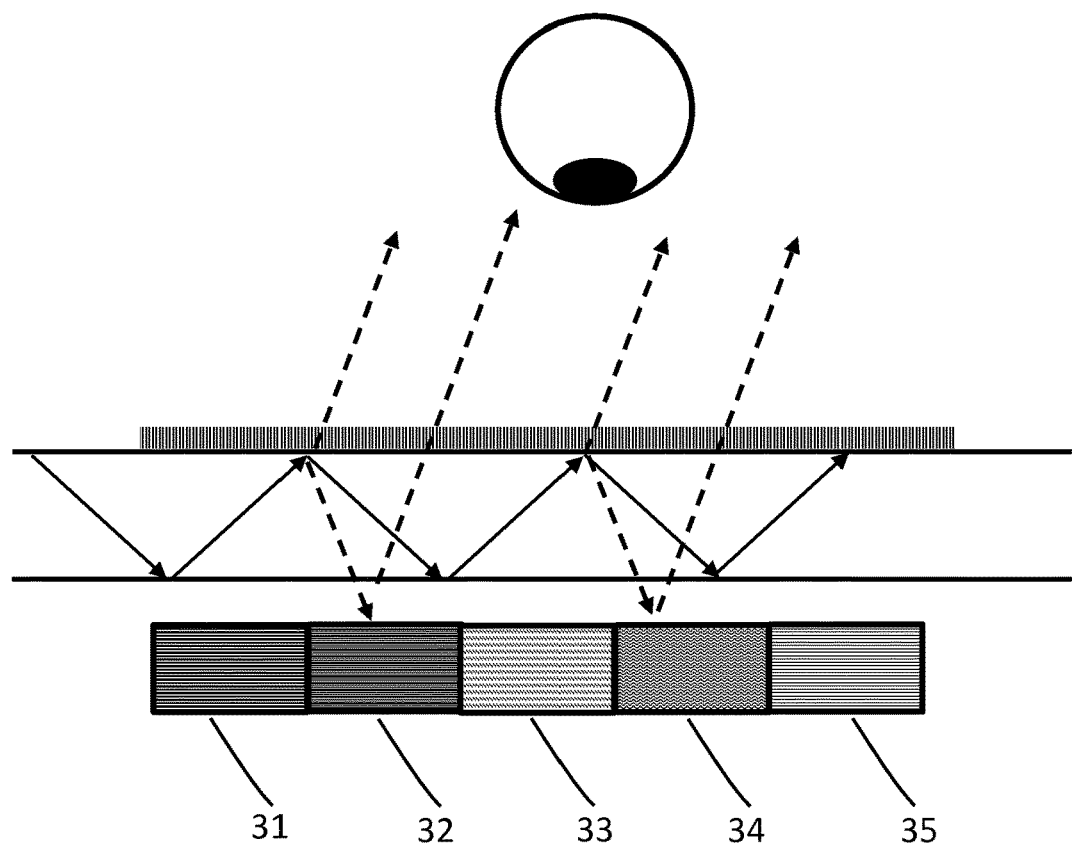
FIG. 3 shows a cross-sectional side view of a section of a waveguide according to another embodiment of the invention.

FIG. 3 illustrates a configuration in which the reflector is divided into segments 31-35. By varying the reflectance of the segments, it is possible to enhance optical performance of the lightguide. For example, the brightness uniformity can be enhanced by increasing the reflectance towards the end of the out-coupler. Color balance can be enhanced by using wavelength dependent reflectors.

Figure 4:
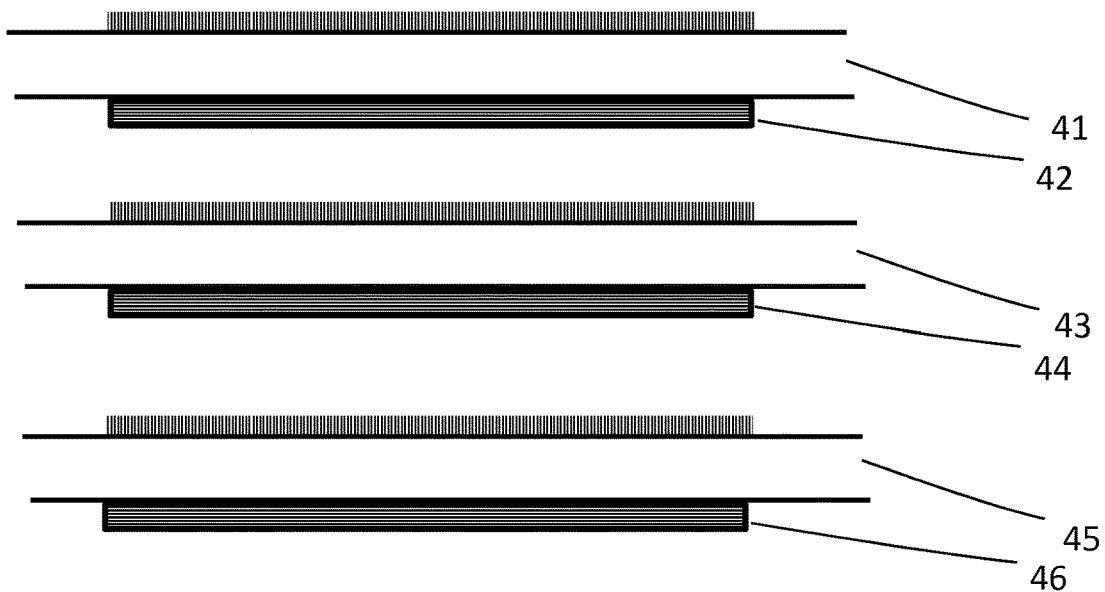
FIG. 4 illustrates a waveguide stack comprising waveguides according to an embodiment of the invention.

The present invention can be used also with lightguide stacks where each primary color propagates in the own lightguide. Such a configuration is presented in FIG. 4. Red, green and blue light propagate each in the own lightguide 41, 43, 45, respectively. Each light guide has an own reflector 42, 44, 46. Each reflector is optimized for the corresponding wavelength band propagating in the lightguide.

Compared with a multi-wavelength single-waveguide approach, the stack approach has the advantage that the design of the reflectors is easier.

Embodiments of the invention can be utilized in various personal display devices, in particular augmented reality (AR) and mixed reality (MR) devices, like near-to-the-eye displays (NEDs) and other head-mounted displays (HMDs), as well as head-up displays (HUDs), in their different forms.

The invention claimed is:

1. A diffractive waveguide display element comprising:
   a waveguide body having a first surface and a second surface opposite to the first surface,
   an out-coupling diffractive optical element on said first surface for coupling light propagating inside the waveguide body out of the waveguide body, and
   a narrow-band reflector element,
   wherein the reflector element is positioned over said second surface and has laterally non-uniform optical properties,
   wherein the reflector element is separated from the waveguide body by a gap having a gap length configured for reducing interference of directly out-coupled light fields and reflected light fields by having an optical path length difference between the directly out-coupled light fields and reflected light fields that is larger than the coherence length of the directly out-coupled light fields and reflected light fields, wherein the gap is an air gap or aerogel layer.

2. The element according to claim 1, wherein the reflector element is a single-band reflector element.

3. The element according to claim 2, wherein the reflector element comprises a dielectric multilayer structure, having a stack of alternating layers having different indices of refraction.

4. The element according to claim 1, wherein the reflector element is a multi-band reflector element.

5. The element according to claim 4, wherein the reflector element comprises a dielectric multilayer structure, having a stack of alternating layers having different indices of refraction.

6. The element according to claim 1, wherein the reflector element has one or more wavelength bands having an FWHM of 50 nm or less, such as 20 nm or less.

7. The element according to claim 6, wherein the reflector element comprises a dielectric multilayer structure, having a stack of alternating layers having different indices of refraction.

8. The element according to claim 1, wherein the reflector element has a total white light transmittance of at least 50%.

9. The element according to claim 8, wherein the reflector element comprises a dielectric multilayer structure, having a stack of alternating layers having different indices of refraction.

10. The element according to claim 1, wherein the reflector element comprises a dielectric multilayer structure, having a stack of alternating layers having different indices of refraction.

11. The element according to claim 1, wherein the reflector element comprises semi-transparent metallic layer, in particular a single layer, such as a layer having a thickness of 20 nm or less.

12. The element according to claim 1, wherein the reflector element is optically insulated from the waveguide body.

13. The element according to claim 1, wherein the reflector element comprises a plurality of distinct segments positioned laterally adjacent to each other, the segments having different reflectances and/or wavelength characteristics.

14. The element according to claim 1, wherein the reflector element contains a first region and a second region downstream of the first region in the propagation direction of light in the waveguide body, and the reflectance of the second region is higher than the reflectance of the first region.

15. A see-through display device, comprising:

the diffractive waveguide display element of claim 1, and a narrow-band projector, such as a laser projector or narrow-band LED projector, comprising at least one narrow-band light source having an output wavelength, wherein:

the projector is configured to couple an image to be displayed into the waveguide body for propagation therein and for further exiting the waveguide body to an eye of a user of the display device, whereby said exiting is configured to occur partially directly from the out-coupling optical element, which is configured as an out-coupling grating, and partially through reflection from the reflector element.

16. The device according to claim 15, further comprising a plurality of such display elements stacked on top of each other, wherein each of the elements comprises a reflector element having different reflectance wavelength band corresponding to an output wavelength of a narrow-band light source of the projector.

17. The device according to claim 16, being a head-up display device or head-mounted display device.

18. The device according to claim 15, being a head-up display device or head-mounted display device.

19. The element according to claim 1, wherein the reflector element has a total white light transmittance of at least 75%.

\* \* \* \* \*